(12) United States Patent
Zhou

(10) Patent No.: US 8,837,567 B2
(45) Date of Patent: Sep. 16, 2014

(54) SYSTEMS AND METHODS FOR CHANNEL ESTIMATION OF MOCA SIGNALS

(75) Inventor: Guangcai Zhou, Agoura Hills, CA (US)

(73) Assignee: Broadcom Corporation, Irvine, CA (US)

( * ) Notice: Subject to any disclaimer, the term of this patent is extended or adjusted under 35 U.S.C. 154(b) by 296 days.

(21) Appl. No.: 13/315,792

(22) Filed: Dec. 9, 2011

(65) Prior Publication Data

US 2013/0101007 A1  Apr. 25, 2013

Related U.S. Application Data

(60) Provisional application No. 61/550,035, filed on Oct. 21, 2011.

(51) Int. Cl.
*H04B 1/10* (2006.01)
*H04L 25/02* (2006.01)

(52) U.S. Cl.
CPC ........ *H04L 25/0204* (2013.01); *H04L 25/0222* (2013.01); *H04L 25/025* (2013.01)
USPC ............................ 375/227; 375/340; 375/257

(58) Field of Classification Search
CPC .................................................. H04L 12/2801
USPC .......................................... 375/227, 340, 257
See application file for complete search history.

(56) References Cited

U.S. PATENT DOCUMENTS

| 6,081,519 | A  * | 6/2000 | Petler ............................ 370/356 |
| 6,791,995 | B1 * | 9/2004 | Azenkot et al. ................ 370/436 |
| 2010/0177833 | A1 * | 7/2010 | Mueller ........................ 375/260 |
| 2011/0026421 | A1 * | 2/2011 | Luo et al. ...................... 370/252 |

* cited by examiner

*Primary Examiner* — Michael Neff
(74) *Attorney, Agent, or Firm* — Sterne, Kessler, Goldstein & Fox P.L.L.C.

(57) ABSTRACT

Systems and methods are provided, for estimating a channel based on previous channel estimations from the same source. Embodiments disclosed herein enable removal of the timing variation (from burst to burst) so that the channel can be more accurately estimated. Embodiments provide several systems and methods for averaging channel estimation information from each of the bursts. The systems and methods disclosed herein advantageously improve channel estimation accuracy and reduce modulation error.

21 Claims, 5 Drawing Sheets

US 8,837,567 B2

SYSTEMS AND METHODS FOR CHANNEL ESTIMATION OF MOCA SIGNALS

CROSS-REFERENCE TO RELATED APPLICATIONS

This application claims the benefit of U.S. Provisional Patent Application No. 61/550,035, filed on Oct. 21, 2011, which is incorporated by reference herein in its entirety.

FIELD OF THE INVENTION

This invention relates to signal processing and more specifically to channel estimation techniques.

BACKGROUND OF THE INVENTION

The Multimedia Over Coax Alliance (MoCA) standard supports networking (for example, home networking) over existing coaxial cable infrastructure. Devices, such as cable set top boxes, incorporating MoCA functionality can communicate over coaxial cable with other devices connected to a network.

MoCA uses adaptive constellation multi-tone (ACMT) modulation, which is a form of orthogonal frequency-division multiplexing (OFDM). OFDM is a frequency-division multiplexing (FDM) scheme used for digital modulation. The ACMT modulation scheme pre-equalizes the modulation-to-frequency response of each path using bit-loading—assigning bits efficiently based on subchannel quality, allowing more bits to be transmitted within higher quality subchannels and fewer bits to be transmitted within lower quality subchannels.

MoCA signals have preambles for frequency estimation, timing estimation, and channel estimation. To improve throughput efficiency, the MoCA 2.0 standard provides an option for reducing the channel estimation (CE) part of the preamble from two ACMT symbols to one ACMT symbol. However, this results in a modulation error ratio 3 dB higher than the actual signal to noise ratio. Further, even with two CE ACMT symbols, the channel estimation error will introduce a signal degradation of 1.8 dB.

Current technology for MoCA channel estimation is based on two channel estimation ACMT (OFDM) symbols, and the estimation therefore introduces 1.8 dB degradation. For the MoCA 2.0 standard, when only one CE symbol is available, the degradation will be as high as 3 dB. This will reduce the throughput and/or dynamic range of a MoCA network.

Systems and methods are needed for providing channel estimation of a burst OFDM signal, especially for burst OFDM signals having a large time variation from burst to burst and low channel quality (for example, as low as 5 dB).

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
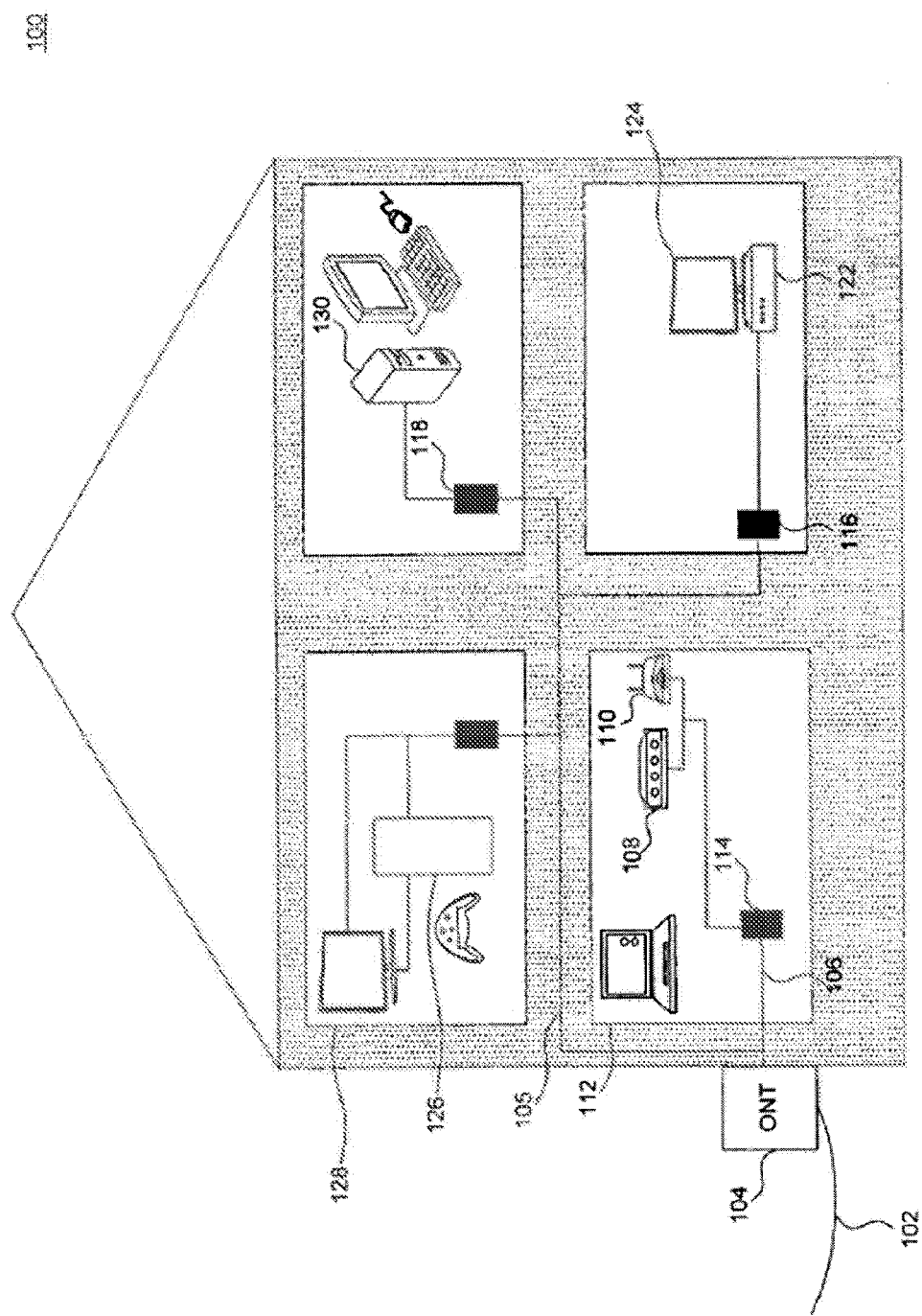
FIG. 1 is a diagram of an exemplary home network 100 utilizing MoCA network architecture.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, stricture, or characteristic is described in connection with an embodiment, it is submitted that it is within the knowledge of one skilled in the art to affect such feature, structure, or characteristic in connection with other embodiments whether or not explicitly described.

In accordance with embodiments of the present disclosure, systems and methods are provided for estimating a channel based on previous channel estimations (CE's) from the same source. Embodiments of the present disclosure enable removal of the timing variation (from burst to burst) so that the channel can be more accurately estimated. Embodiments of the present disclosure provide several systems and methods for averaging channel estimation information from each of the bursts. The systems and methods disclosed herein advantageously improve channel estimation accuracy and reduce modulation error.

1. MOCA NETWORK ARCHITECTURE

The Multimedia Over Coax Alliance (MoCA) standard supports networking (for example, home networking) over existing coaxial cable infrastructure. Devices, such as cable set top boxes, incorporating MoCA functionality can communicate over coaxial cable with other devices connected to a network.

FIG. 1 depicts an exemplary home network 100 utilizing MoCA network architecture. In FIG. 1, fiber optic cable 102 carries data (e.g, internet data and/or television data) from a service provider to optical network terminal (ONT) 104 at a home of an end user. Coaxial cable 106 connects MoCA adapter 114 to a cable outlet (not shown) in the home of the end user. The cable outlets exchange information with ONT 104 via internal home wiring 105. Thus, MoCA adapters 114, 116, 118, and 120 use existing coaxial cable infrastructure in the home of the end user to establish a home network. The end user may establish a home network by connecting MoCA adapters 114, 116, 118, 120 to cable outlets and may thus avoid using additional wiring to provide internet access to devices in the home. It should be noted that, while MoCA adapters 114, 116, 118, and 120 are shown as separate devices in FIG. 1, MoCA adapters 114, 116, 118, and/or 120 may be implemented into other hardware. For example, MoCA adapter 116 may be implemented into cable set top box 122.

In FIG. 1, each of MoCA adapters 114, 116, 118, and 120 is shown connected to device(s) in different rooms of the home to provide services to these device(s). For example, MoCA adapter 114 connects to cable modem 108 and wireless router 110, which provides wireless internet access to laptop 112. MoCA adapter 116 connects to set top box 122, which provides cable TV service to TV 124. MoCA adapter 118 connects to PC 130 to provide internet access to PC 130. MoCA adapter 120 connects to video game console 126 and TV 128 to provide internet access to video game console 126 and TV service to TV 128. Each of MoCA adapters 114, 116, 118, and 120 may also send data to and from other MoCA adapters in home network 100 (and, thus, data may be sent to and from the devices connected to home network 100).

Because each of these devices transmits and receives data over the same coaxial cable infrastructure, MoCA adapters 114, 116, 118, and 120 include functionality for time sharing, and data transmitted from each device (e.g., video game console 126 and PC 130) is sent as a burst. A network card (for example, implemented in one or more of MoCA adapters 114, 116, 118, and 120) schedules when bursts are sent to prevent collisions.

2. CHANNEL ESTIMATION SYSTEMS

Each MoCA burst has a preamble(s) that includes information for frequency estimation, timing estimation, and channel estimation (CE). The CE information in the preamble describes the current state of the channel (e.g., how the signal propagates from the transmitter to the receiver), and channel estimation can include amplitude response estimation and/or phase response estimation (i.e., channel estimation methods disclosed herein can use either amplitude response estimation, phase response estimation, or both amplitude response estimation and phase response estimation). CE information can be used to recover transmitted signals and to adapt transmissions to changing conditions in the channel.

As discussed above, MoCA uses adaptive constellation multi-tone (ACMT) modulation, which is a form of orthogonal frequency-division multiplexing (OFDM) using bit-loading. Embodiments of the present disclosure can be used with any form of OFDM communications using burst packets, and embodiments of the present disclosure are especially useful when the channel slowly changes or is static.

The MoCA 2.0 standard provides an option for reducing the channel estimation (CE) part of the preamble from two ACMT symbols to one ACMT symbol. However, this results in a modulation error ratio 3 dB higher than the actual signal to noise ratio. Further, even with two CE ACMT symbols, the channel estimation error will introduce a signal degradation of 1.8 dB.

Embodiments of the present disclosure provide systems and methods for estimating the channel based on previous channel estimations from the same source. As discussed above, MoCA transmissions can be sent in scheduled bursts, and there is often a time variation between bursts sent from the same source. Because different parts of a frame may be sent in different bursts, and because the receiver's clock may not be perfectly precise, the receiver may receive data with a shift in time from one frame to another. This time shift makes averaging the channel estimation information in two different data frames more difficult. Embodiments of the present disclosure remove this timing information to improve the accuracy of channel estimation.

Embodiments of the present disclosure may be implemented using hardware and/or software. For example, a channel estimation module according to an embodiment may be implemented into a network card. In an embodiment, the channel estimation module may be implemented into hardware of a MoCA adapter (i.e., the channel estimation module may be implemented into the hardware of one or more of MoCA adapters 114, 116, 118, and 120). Memory may also be included as part of the channel estimation module (or may be accessible by the channel estimation module) for performing channel estimation operations.

In an embodiment, the channel estimation module is configured to receive data from two or more MoCA transmission bursts, remove the timing variation information, and average the channel estimation information from each MoCA transmission burst. The removal of this timing information enables the channel to be more accurately measured from burst to burst.

When systems and methods according to embodiments of the present disclosure are utilized, the 1.8 dB degradation (when two CE symbols are used) or 3 dB degradation (when one CE symbol is used) can be almost fully removed. For example, in a MoCA 1.0/1.1 system, the 1.8 dB degradation is reduced to about 0.1 dB or lower, and the overall signal quality improvement is about 1.7 dB or higher. In a MoCA 2.0 system, the channel estimation impact can be improved from 3 dB to about 0.1 dB or lower, and the overall signal quality improvement is about 2.9 dB or higher. These improvements advantageously increase the PHY layer's throughput by about 70 mbps and/or the dynamic range of a MoCA network by about 3 dB.

Additional operations that may be performed by the channel estimation module in accordance with embodiments of the present disclosure are explained below in greater detail.

3. CHANNEL ESTIMATION METHODS

As previously, discussed, channel estimation can be used by a receiver to more accurately recover transmitted signals. Channel estimation methods according to embodiments of the present disclosure can use the following procedure for channel estimation: (1) average the amplitude from different bursts; (2) estimate the timing difference for different bursts using an averaging method discussed below; (3) remove the timing effect for different bursts so that the phase can be estimated; and (4) reapply the timing estimation for individual bursts so that the channel estimation for the burst can be calculated.

In an embodiment, a channel (without noise) may be represented by the expression $g_k e^{j\theta_k}$, where $g_k$ is gain and $\theta_k$ is phase at subcarrier $C_k$, for k=1, 2, ... K, where K is the total number of available subcarriers. Thus, a received signal can be represented by the following expression (with $n_k$ representing noise and $m_k$ representing the transmitted signal):

$$c_k = g_k e^{j\theta_k} m_k + n_k \qquad (1)$$

The impact of changing conditions in a channel may be observed by measuring changes between two or more CE signals sent over the same channel. In an embodiment, these two signals may be the same when transmitted (for example, they may both be simply a transmitted "1"). However, because the CE signals are sent at different time, a timing offset ($\Delta t$) may also impact the channel estimation. At instant i, the received signal may be represented by the following expression:

$$r_k^i = g_k e^{j\theta_k} m_k^i + n_k^i \qquad (2)$$

If a transmitted signal is set as 1 for the purposes of channel estimation, then a recovered signal may then be represented by the expression:

$$\hat{m}_k^i = \frac{r_k^i}{c_k} = \frac{g_k e^{j\theta_k} m_k^i + n_k^i}{g_k e^{j\theta_k} + n_k} = m_k^i + g_k^{-1} e^{-j\theta_k} n_k^i - m_k^i g_k^{-1} e^{-j\theta_k} n_k + \Delta(n_k^i, n_k) \qquad (3)$$

In equation 3 above, $\Delta(n_k^i, n_k)$ is the function of $n_k^i$, $n_k$ with at least orders of two. When the signal to noise ratio (SNR) is higher (e.g., 10 dB), the noise impact will be dominated by the first order of $n_k^i$, $n_k$. Thus, in an embodiment, the impact of $\Delta(n_k^i, n_k)$ to signal quality may be ignored. The variance of $\hat{m}_k^i - m_k^i$ will be $g_k^{-2}(\text{var}(n_k^i) + \text{var}(n_k))$. If the channel estimation is based on two symbols (as is the case for MoCA 1.0 and MoCA 1.1), $$\text{var}(n_k) = \frac{1}{2}\text{var}(n_k^i)).$$

If the channel estimation is based on one symbol (as is the case for MoCA 2.0), $\text{var}(n_k) = \text{var}(n_k^i)$. Therefore, comparing to perfect channel estimation, the estimated SNR and true SNR have the following relationship:

$$SNR_{est} = SNR_{real} - 10\log_{10}(1.5) = SNR_{real} - 1.76 \text{ (dB) for two CE symbols} \qquad (4)$$

$$SNR_{est} = SNR_{real} - 10\log_{10}(2) = SNR_{real} - 3.01 \text{ (dB) for one CE symbol} \qquad (5)$$

If N CE symbols are available for estimation, the estimation error will have the impact $$10\log_{10}\left(1 + \frac{1}{N}\right).$$

Methods to average N channel estimations from N different MoCA frames (transmitted from the same source and using the same channel) will now be discussed.

Figure 2:
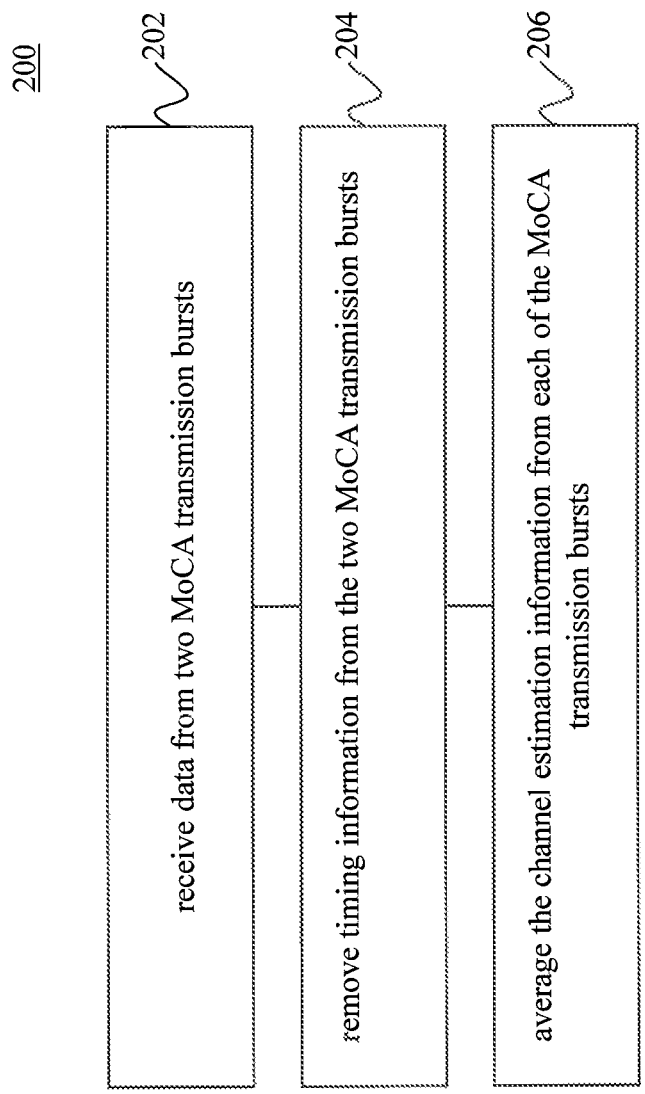
FIG. 2 is a flowchart of a method of channel estimation.

A method 200 of channel estimation according to an embodiment of the present disclosure will now be explained with reference to FIG. 2. In step 202, data from two MoCA transmission bursts (i.e., two MoCA frames) from the same source is received. Because of the timing offset between the two MoCA frames, the two channel estimations are not directly averaged. In step 204, the timing information from the bursts is removed. In step 206, the channel estimation information from each of the bursts is averaged. Averaging the channel estimation information after the timing information is removed advantageously provides a more accurate channel estimation. The timing offset information may then be added back to each MoCA frame.

Figure 3:
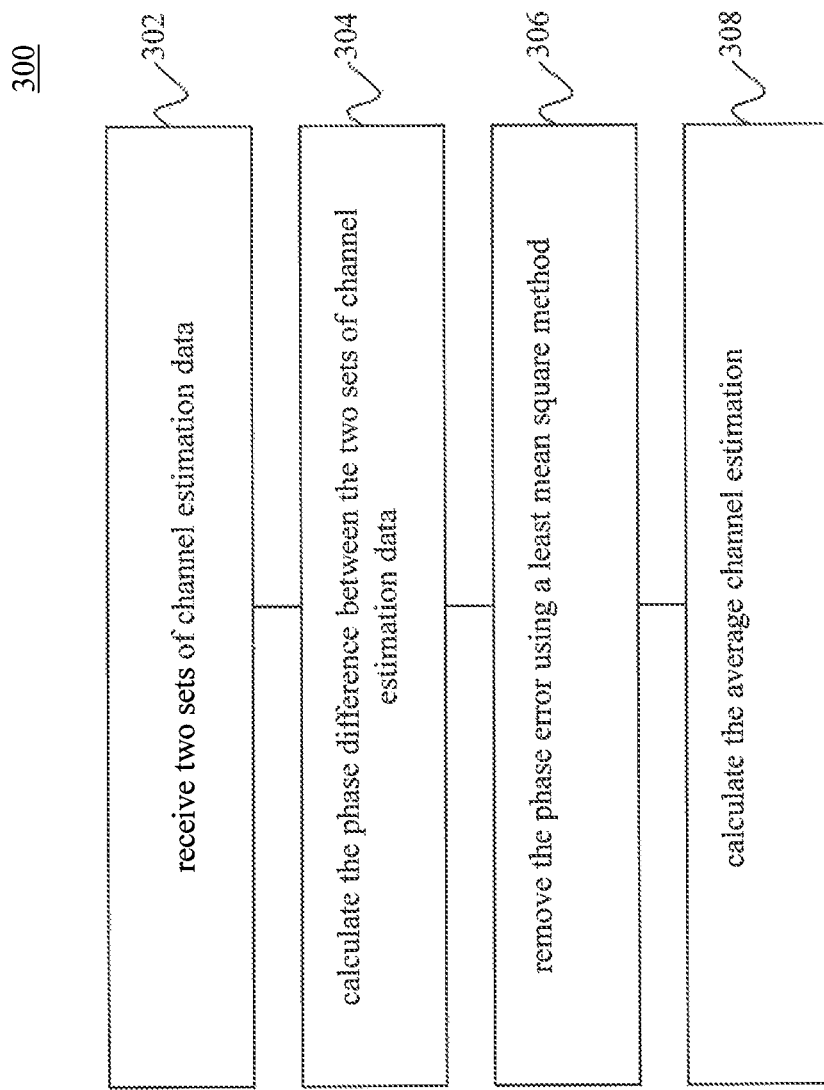
FIG. 3 is a flowchart of a method of channel estimation averaging for MoCA signals with good quality.

A method 300 of channel estimation averaging for MoCA signals according to an embodiment of the present disclosure will now be explained with reference to FIG. 3. For signals from the same source, channel estimation at a receiver is based on samples taken at different times. Thus, in step 302, two sets of channel estimation data (taken at different times), are received (e.g., from information in transmitted MoCA frame preambles). The first set of data (e.g., $c_1^1 \ldots c_n^1$) represents data for a first frame, and the second set of data (e.g., $c_1^2 \ldots c_n^2$) represents data for a second frame.

Because the two sets of data were taken at different times, a time offset ($\Delta t$) exists representing the time taken between the two samples. This time offset is removed before the sets of channel estimation data are averaged. For some channels, the boundary of the start of a frame may not clear. The time offset can thus vary (e.g., by up to 100 ns) from frame to frame. A 100 ns timing offset can cause a phase transition of 7 degrees between two adjacent subcarriers.

To find $\Delta t$, the phase difference between the two sets of data is calculated in step 304. In an embodiment, the phase difference for each tone over the two frames is calculated. For example, the phase difference between $c_1^1$ and $c_1^2$, $c_2^1$ and $c_2^2 \ldots c_n^1$ and $c_n^2$ is calculated.

Calculation of the phase difference over two frames will now be explained in greater detail. As previously discussed, the channel may be represented by the expression $g_k e^{j\theta_k} + n_k$. Thus, at one time instant for one MoCA frame, the estimated channel (for available subcarriers $C_1$ to $C_k$ at frequencies $f_1$ to $f_k$) may be represented by the expression:

$$(g_1 e^{j\theta_1} + n_1^1, \ldots, g_k e^{j\theta_k} + n_k^1) \qquad (6)$$

For another MoCA frame, if the relative time offset between the start of CE and the sampling for the first frame and for the second frame is $\tau$, then for this frame, the channel estimation can be represented by the expression:

$$(g_1 e^{j(\theta_1 + 2\pi f_1 \tau + \phi)} + n_1^2, \ldots, g_k e^{j(\theta_k + 2\pi f_k \tau + \phi)} + n_k^2) \qquad (7)$$

In equation (7) above, $\phi$ represents the phase offset due to phase noise (phase error). In step 306, this phase error $\phi$ is removed using a least mean square method (LMSE) (also known as "minimum mean square method"). Embodiments of the present disclosure advantageously reduce the LMSE error due to bad subcarriers. The channel estimation error at frame k may be represented by the following expression (where $\hat{g}_i$ is the gain average for subcarrier $C_k$ at frame k):

$$\sigma_k^2 = \sum_{i=1}^{K} |\hat{g}_i e^{j(\hat{\theta}_i + 2\pi f_i \hat{\tau}_k + \psi_k)} - g_i e^{j(\theta_i + 2\pi f_i \tau_k)}|^2 \qquad (8)$$

The channel estimation error adds-up with noise power level $\sigma^2$, and the overall noise level will be $\sigma_k^2 + \sigma^2$. In an embodiment, a solution ($\hat{\tau}_k, \phi_k$) is found using a least mean square method such that $(\theta_1^k, \ldots, \theta_k^k)$ and $(\phi_k + 2\pi f_1 \hat{\tau}_k, \ldots, \phi_k + 2\pi f_K \hat{\tau}_K)$ have the least mean square error, where $\tau_k$ is the real timing offset. More specifically, the following equations can be used to define $2\pi \hat{\tau}_k$ and $\phi_k$:

$$2\pi \hat{\tau}_k = \frac{\sum_{i=1}^{K} \theta_i^k \sum_{i=1}^{K} f_i - \sum_{i=1}^{K} \theta_i^k f_i}{\left(\sum_{i=1}^{K} f_i\right)^2 - \sum_{i=1}^{K} \theta_i^k f_i^2} \qquad (9)$$

$$\varphi_k = \frac{1}{K}\sum_{i=1}^{K} \theta_i^k - \frac{2\pi \hat{\tau}_K}{K}\sum_{i=1}^{K} f_i \qquad (10)$$

After the phase offset is removed, the average channel estimation $\hat{c}_i$ for subcarrier $C_i$ may be calculated in step 308. As shown above in equation (7), $$\hat{c}_i = \hat{g}_i e^{j(\hat{\theta}_k + 2\pi f_i \hat{\tau}_k + \phi_k)} \qquad (11)$$

As discussed above, when SNR is high (e.g, 10 dB), the noise impact will be dominated by the first order of $n_k^i$, $\tilde{n}_k$ and may be ignored. Thus, once $2\pi\hat{\tau}_K$ and $\phi_k$ are calculated, the average channel estimation $\hat{c}_k$ may be defined by the average gain $\hat{g}_k$ and the average phase $\hat{\theta}_k$. Pseudo code of an algorithm for averaging channel estimation information according an embodiment of the present disclosure is shown below:

---

Channel Estimation Algorithm 1
(high SNR - e.g., SNR > 10 dB)

1. Set the value of a constant $\alpha$, say $\alpha = \frac{1}{128}$.

2. Assume we have frame number 0:
   a. Estimate the channel based on its CE, and get the channel estimation $(c_1^0, \ldots, c_K^0)$.
   b. Set the averaged channel estimation $(\hat{c}_1, \ldots, \hat{c}_K) = (c_1^0, \ldots, c_K^0)$. The channel estimation can be represented as $(\hat{g}_1, \ldots, \hat{g}_K)$ and $(\hat{\theta}_1, \ldots, \hat{\theta}_K)$.

3. For $k = 1, 2, \ldots$, (the coming frames from the same MoCA node):
   a. Get the channel estimation $(c_1^k, \ldots, c_K^k)$ for this frame based on its own preamble (CE).
   b. Let, $\hat{g}_i = (1-\alpha)\hat{g}_i + \alpha |c_i^k|$ for $i = 1, 2, \ldots, K$.
   c. Let $(d_1^k, \ldots, d_K^k) = (c_1^k \tilde{c}_1, \ldots, c_K^k \tilde{c}_K)$, where $\tilde{c}_i$ is the conjugate of $\hat{c}_i$ for $i = 1, 2, \ldots, K$.
   d. Let $(\theta_1^k, \ldots, \theta_K^k)$ be the unwrapped phase of $(d_1^k, \ldots, d_K^k)$.
   e. Let $(\hat{\tau}_1, \phi_k)$ be the solution such that $(\theta_1^k, \ldots, \theta_K^k)$ and $(\phi_k + 2\pi f_1 \hat{\tau}_K, \ldots, \phi_k + 2\pi f_K \hat{\tau}_K)$ have the least mean square error where $\tau_k$ is the real timing offset. More specifically:

$$2\pi\hat{\tau}_K = \frac{\sum_{i=1}^{K}\theta_i^k \sum_{i=1}^{K} f_i - \sum_{i=1}^{K}\theta_i^k f_i}{\left(\sum_{i=1}^{K} f_i\right)^2 - \sum_{i=1}^{K}\theta_i^k f_i^2}$$

$$\varphi_k = \frac{1}{K}\sum_{i=1}^{K}\theta_i^k - \frac{2\pi\hat{\tau}_K}{K}\sum_{i=1}^{K} f_i$$

f. Let $\hat{\theta}_i = (1-\alpha)\hat{\theta}_i + \alpha(\theta_i^k - \phi_k - 2\pi f_i \hat{\tau}_k)$ for $i = 1, 2, \ldots, K$.
   g. Use the channel estimation $$\left(\hat{g}_1 e^{j(\hat{\theta}_1 + 2\pi f_1 \hat{\tau}_k + \varphi_k)}, \ldots, \hat{g}_K e^{j(\hat{\theta}_K + 2\pi f_K \hat{\tau}_K + \varphi_K)}\right)$$

for current frame.
end

---

As previously discussed, the algorithm above averages channel estimation information from MoCA bursts. Averaging the channel estimation information after the timing information is removed provides a more accurate channel estimation and thus can be used to improve MoCA burst communications quality and stability.

In the algorithm shown above, the constant $\alpha$ is chosen based on a desired amount of variance (between the computed average channel estimation and the original CE estimates) and a desired speed of computation of the algorithm. Choosing a higher value for $\alpha$ (e.g., 1/64, shifting 6 bits out instead of 7) results in a shorter time to compute channel estimation in the algorithm described above; however, the variance of the channel estimation estimates will increase because the algorithm will take less time to smooth the variance. If a lower value for $\alpha$ is chosen (e.g., 1/256, shifting 8 bits instead of 7), the algorithm will take longer to compute the average channel estimation, but the variance will decrease. Thus, the constant $\alpha$ is chosen based on a desired tradeoff between speed of computation and variance among samples.

If some subcarriers are unavailable or if the channel quality is much worse than other tones, these subcarriers may be excluded in the above calculations. For low quality subcarriers, the estimation by the current CE may be used.

When SNR is too low, occasionally some subcarriers may have a phase error of more than 180 degrees. Its this case, the timing error estimation may be wrong, and it can destroy the whole frame as a result. Another potential problem arises in the case that some subcarriers are unavailable so that phase unwrapping may be wrong.

Figure 4:
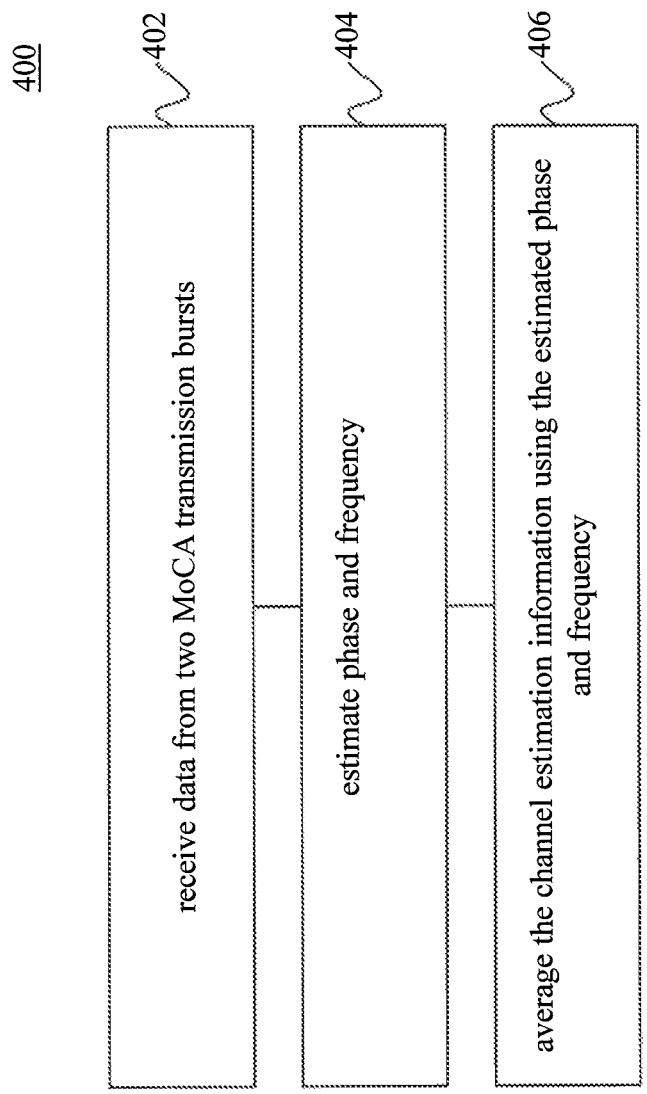
FIG. 4 is a flowchart of a method of channel estimation averaging for MoCA signals with low quality.

To address these issues, if initial channel estimation shows the channel quality (e.g., the SNR) is less than 10 dB, a channel estimation method based on frequency estimation is used rather than the LMSE solution described above. A method 400 of channel estimation averaging for MoCA signals with low quality according to an embodiment of the present disclosure will now be explained with reference to FIG. 4. In step 402, data from two MoCA transmission bursts (i.e., two MoCA frames) from the same source is received. Because of the timing offset between the two MoCA frames, the two channel estimations are not directly averaged. In step 404, phase and frequency are estimated. For example, phase and frequency can be estimated based on any of the methods for phase and frequency estimation described in IEEE Transactions on Communications, Vol. 45, No. 1 "Data-Aided Frequency Estimation for Burst Digital Transmission" by Umberto Mengali and M. Morelli, published January 1997, which is incorporated by reference herein in its entirety. In step 406, the average channel estimation is determined using the estimated phase and frequency. Pseudo code of an algorithm according an embodiment of the present disclosure is shown below:

---

Channel Estimation Algorithm 2
(low SNR - e.g., SNR < 10 dB)

1. Set the value of a constant $\alpha$, say $\alpha = \frac{1}{128}$.

2. Assume we have frame number 0:
   a. Estimate the channel based on its CE, and get the channel estimation $(c_1^0, \ldots, c_K^0)$.
   b. Set the averaged channel estimation $(\hat{c}_1, \ldots, \hat{c}_K) = (c_1^0, \ldots, c_K^0)$. The channel estimation can be represented as $(\hat{g}_1, \ldots, \hat{g}_K)$ and $(\hat{\theta}_1, \ldots, \hat{\theta}_K)$.

3. For $k = 1, 2, \ldots$, (the coming frames from the same MoCA node):
   a. Get the channel estimation $(c_1^k, \ldots, c_K^k)$ for this frame based on its own preamble (CE).
   b. Let, $\hat{g}_i = (1-\alpha)\hat{g}_i + \alpha |c_i^k|$ for $i = 1, 2, \ldots, K$.
   c. Let $(d_1^k, \ldots, d_K^k) = (c_1^k \tilde{c}_1, \ldots, c_K^k \tilde{c}_K)$, where $\tilde{c}_i$ is the conjugate of $\hat{c}_i$ for $i = 1, 2, \ldots, K$.
   d. Let $(\theta_1^k, \ldots, \theta_K^k)$ be the unwrapped phase of $(d_1^k, \ldots, d_K^k)$.
   e. Let $(\hat{\tau}_1, \phi_k)$ be the solution such that $(d_1^k, \ldots, d_K^k)$ has a phase and frequency estimation $(\phi_k + 2\pi f_1 \hat{\tau}_K, \ldots, \phi_k + 2\pi f_K \hat{\tau}_K)$ (e.g., using any phase/frequency estimation method).
   f. Let $\hat{\theta}_i = (1-\alpha)\hat{\theta}_i + \alpha(\theta_i^k - \phi_k - 2\pi f_i \hat{\tau}_k)$ for $i = 1, 2, \ldots, K$.
   g. Use the channel estimation $$\left(\hat{g}_1 e^{j(\hat{\theta}_1 + 2\pi f_1 \tau_k + \varphi_k)}, \ldots, \hat{g}_K e^{j(\hat{\theta}_K + 2\pi f_K \tau_K + \varphi_K)}\right)$$

for current frame.
end

As previously discussed, when SNR is high (e.g., 10 dB or greater), the noise impact will be dominated by the first order of $n_k^i$, $n_k$ and may be ignored, and, once $2\pi\hat{\tau}_K$ and $\phi_k$ are calculated, the average channel estimation $\hat{c}_k$ may be defined by the average gain $\hat{g}_k$ and the average phase $\hat{\theta}_k$. In such a situation, channel estimation algorithm 1 can be used. However, when SNR is too low, phase errors in some subcarriers can cause the timing error estimation to be wrong. In such a case, a channel estimation method based on frequency estimation is used rather than a channel estimation method using the LMSE solution of channel estimation algorithm 2. Thus, a channel estimation module in accordance with embodiments of the present disclosure (e.g., a channel estimation module implemented into the hardware of one or more of MoCA adapters 114, 116, 118, and 120) can be configured to determine the SNR of the channel prior to selecting a channel estimation method (e.g., channel estimation algorithm 1 or channel estimation algorithm 2).

Figure 5:
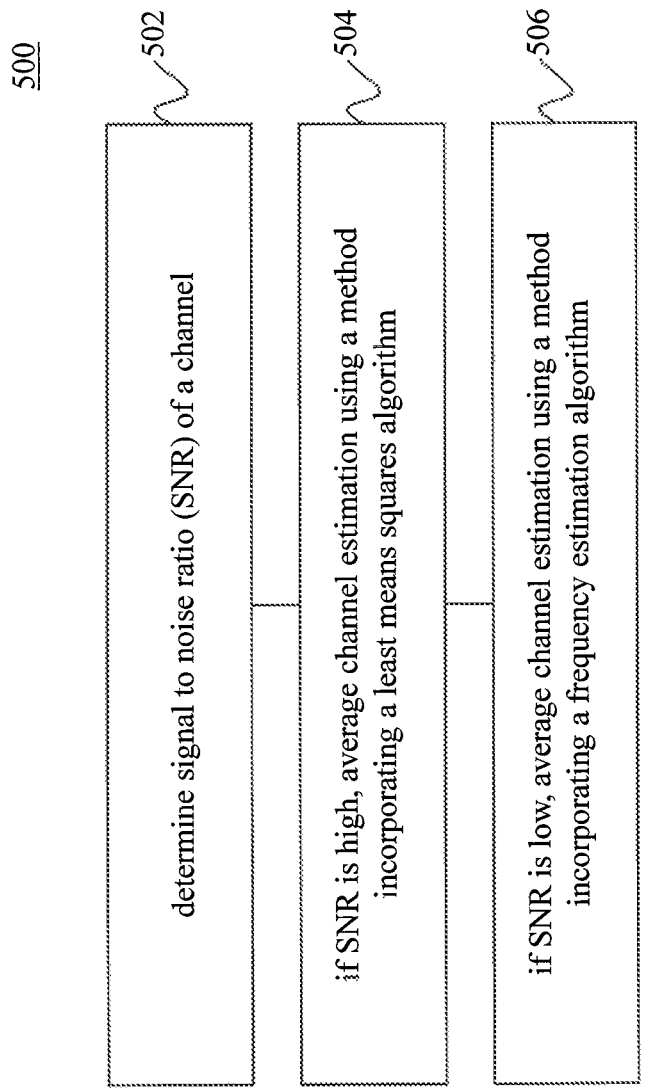
FIG. 5 shows a flowchart of a method used by a channel estimation module to for determining a channel estimation algorithm to use based on a determined SNR.

FIG. 5 shows a flowchart of a method used by a channel estimation module to for determining a channel estimation algorithm to use based on a determined SNR. In step 502, the SNR of the channel is determined by the channel estimation module. If the determined SNR is high (e.g., >10 dB), the channel estimation module averages channel estimation using a method incorporating a least means squares algorithm (e.g., channel estimation algorithm 1) in step 504. If the determined SNR is low (e.g., <10 dB), the channel estimation module averages channel estimation using a method incorporating a frequency estimation algorithm (e.g., channel estimation algorithm 2) in step 506.

The representative signal processing functions described herein (e.g. channel estimation, etc.) can be implemented in hardware, software, or some combination thereof. For instance, the signal processing functions can be implemented using computer processors, computer logic, application specific circuits (ASIC), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

4. CONCLUSION

It is to be appreciated that the Detailed Description, and not the Abstract, is intended to be used to interpret the claims. The Abstract may set forth one or more but not all exemplary embodiments of the present as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A Multimedia Over Coax Alliance (MoCA) adapter including a channel estimation module, wherein the channel estimation module is configured to:
   receive data from two MoCA transmission bursts, wherein each MoCA transmission burst includes channel estimation data;
   remove timing information from the MoCA transmission bursts; and
   average the channel estimation data from the MoCA transmission bursts.

2. The MoCA adapter of claim 1, wherein the channel estimation module is further configured to calculate a phase difference between the MoCA transmission bursts.

3. The MoCA adapter of claim 1, wherein the channel estimation module is further configured to remove a phase error between the MoCA transmission bursts.

4. The MoCA adapter of claim 3, wherein the channel estimation module is further configured to remove the phase error using a least mean square method.

5. The MoCA adapter of claim 1, wherein the channel estimation module is further configured to:
estimate a phase and a frequency of the MoCA transmission bursts; and
average the channel estimation data from the MoCA transmission bursts using the estimated phase and frequency.

6. The MoCA adapter of claim 1, wherein the channel estimation module is further configured to:
determine a signal to noise ratio (SNR) of a channel used for transmission of the MoCA transmission bursts; and
select a channel estimation algorithm based on the SNR, wherein the channel estimation algorithm is used to average the channel estimation data from the MoCA transmission bursts.

7. A system comprising:
a first Multimedia Over Coax Alliance (MoCA) adapter configured to transmit two MoCA transmission bursts, wherein each MoCA transmission burst includes channel estimation data; and
a second MoCA adapter in communication with the first MoCA adapter, wherein the second MoCA adapter includes a channel estimation module, and wherein the channel estimation module is configured to:
receive the MoCA transmission bursts,
remove timing information from the MoCA transmission bursts, and
average the channel estimation data from the MoCA transmission bursts.

8. The system of claim 7, wherein the channel estimation module is further configured to calculate a phase difference between the MoCA transmission bursts.

9. The system of claim 7, wherein the channel estimation module is further configured to remove a phase error between the MoCA transmission bursts.

10. The system of claim 9, wherein the channel estimation module is further configured to remove the phase error using a least mean square method.

11. The system of claim 7, wherein the channel estimation module is further configured to:
estimate a phase and a frequency of the MoCA transmission bursts; and
average the channel estimation data from the MoCA transmission bursts using the estimated phase and frequency.

12. The system of claim 7, wherein the channel estimation module is further configured to:
determine a signal to noise ratio (SNR) of a channel used for transmission of the MoCA transmission bursts; and
select a channel estimation algorithm based on the SNR, wherein the channel estimation algorithm is used to average the channel estimation data from the MoCA transmission bursts.

13. A method comprising:
receiving data from two Multimedia Over Coax Alliance (MoCA) transmission bursts in a channel, wherein each MoCA transmission burst includes channel estimation data;
determining a signal to noise ratio (SNR) of the channel;
selecting a channel estimation algorithm based on the SNR; and
calculating an average channel estimation for the MoCA transmission bursts using the selected channel estimation algorithm, wherein calculating the average channel estimation includes removing timing information from the MoCA transmission bursts.

14. The method of claim 13, further comprising calculating a phase difference between the MoCA transmission bursts.

15. The method of claim 13, further comprising removing a phase error between the MoCA transmission bursts.

16. The method of claim 15, further comprising removing the phase error using a least mean square method.

17. The method of claim 13, further comprising:
estimating a phase and a frequency of the MoCA transmission bursts; and
averaging the channel estimation data from the MoCA transmission bursts using the estimated phase and frequency.

18. The method of claim 13, wherein selecting the channel estimation algorithm based on the SNR comprises selecting a first channel estimation algorithm if the SNR is greater than 10 dB and a second channel estimation algorithm if the SNR is lesser than 10 dB.

19. The method of claim 13, wherein selecting the channel estimation algorithm based on the SNR comprises selecting a channel estimation algorithm incorporating a least mean squares algorithm responsive to determining that the SNR is greater than or equal to a predetermined SNR.

20. The method of claim 13, wherein selecting the channel estimation algorithm based on the SNR comprises selecting a channel estimation algorithm incorporating a frequency estimation algorithm responsive to determining that the SNR is lesser than a predetermined SNR.

21. The method of claim 13, further comprising:
determining whether the SNR is greater than or equal to a predetermined SNR; and
selecting the channel estimation algorithm based on whether the SNR is greater than or equal to the predetermined SNR.

* * * * *